United States Patent
Uehara et al.

(10) Patent No.: US 9,841,104 B2
(45) Date of Patent: Dec. 12, 2017

(54) SHAFT SEALING APPARATUS

(71) Applicant: MITSUBISHI HEAVY INDUSTRIES, LTD., Tokyo (JP)

(72) Inventors: Hidekazu Uehara, Tokyo (JP); Tanehiro Shinohara, Tokyo (JP); Shin Nishimoto, Tokyo (JP); Takashi Nakano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 117 days.

(21) Appl. No.: 13/755,009

(22) Filed: Jan. 31, 2013

(65) Prior Publication Data
US 2013/0234397 A1  Sep. 12, 2013

(30) Foreign Application Priority Data
Mar. 8, 2012  (JP) ................. 2012-051464

(51) Int. Cl.
*F01D 11/02* (2006.01)
*F16J 15/32* (2016.01)
(Continued)

(52) U.S. Cl.
CPC ............ *F16J 15/32* (2013.01); *F01D 11/025* (2013.01); *F16J 15/3288* (2013.01);
(Continued)

(58) Field of Classification Search
CPC .... F16J 15/3288; F16J 15/3292; F16J 15/348; F16J 15/32; F16J 15/442; F16J 15/443;
(Continued)

(56) References Cited

U.S. PATENT DOCUMENTS 5,181,728 A * 1/1993 Stec ........................ 277/355
5,318,309 A * 6/1994 Tseng ..................... F01D 11/02
                                                      277/347
(Continued)

FOREIGN PATENT DOCUMENTS

| CN | 1410690 | 4/2003 |
| CN | 1573024 | 2/2005 |

(Continued)

OTHER PUBLICATIONS

International Search Report mailed Mar. 5, 2013 in International (PCT) Application No. PCT/JP2013/052376 with a partial English translation.
(Continued)

*Primary Examiner* — Nathan Cumar
(74) *Attorney, Agent, or Firm* — Wenderoth, Lind & Ponack, L.L.P.

(57) ABSTRACT

Provided is a shaft sealing apparatus, which includes a seal ring that is installed in an annular space between a rotor and a stator surrounding an outer circumference side of the rotor, that is formed in a divided structure from a movable seal ring and a stationary seal ring whose circumferential ends are adjacent to each other, and that is configured so that the movable seal ring is biased toward a radial outer side thereof by an elastic body, a seal body that is formed by stacking a plurality of thin seal pieces, which extend from the seal ring toward a radial inner side of the rotor, in a circumferential direction of the rotor, and a communicating part that causes the low-pressure side region and the high-pressure side region to communicate with each other.

3 Claims, 8 Drawing Sheets

(51) Int. Cl.
  *F16J 15/3292* (2016.01)
  *F16J 15/44* (2006.01)
  *F16J 15/3288* (2016.01)
  *F01D 11/00* (2006.01)

(52) U.S. Cl.
  CPC ......... *F16J 15/3292* (2013.01); *F16J 15/442* (2013.01); *F01D 11/001* (2013.01); *F05D 2240/59* (2013.01)

(58) Field of Classification Search
  CPC ....... F16J 15/48; F01D 11/025; F01D 11/001; F05D 2240/59
  USPC .......................................... 277/355, 358, 345
  See application file for complete search history.

(56) References Cited

U.S. PATENT DOCUMENTS

| | | | |
|---|---|---|---|
| 6,131,910 A | 10/2000 | Bagepalli et al. | |
| 6,131,911 A * | 10/2000 | Cromer et al. | ............... 277/355 |
| 6,267,381 B1 | 7/2001 | Wright | |
| 6,601,853 B2 * | 8/2003 | Inoue | ................... F16J 15/3292 277/355 |
| 6,976,680 B2 * | 12/2005 | Uehara | ................ F16J 15/3292 277/355 |
| 7,434,813 B1 | 10/2008 | Franceschini et al. | |
| 2001/0007384 A1* | 7/2001 | Skinner | .................. F01D 9/023 277/355 |
| 2002/0190474 A1 | 12/2002 | Turnquist et al. | |
| 2006/0033285 A1* | 2/2006 | Nishimoto | ........... F16J 15/3292 277/355 |
| 2006/0192343 A1* | 8/2006 | Hashiba et al. | ............... 277/355 |
| 2008/0169616 A1* | 7/2008 | Awtar | ................... F01D 11/025 277/593 |
| 2011/0068539 A1 | 3/2011 | Nakano et al. | |

FOREIGN PATENT DOCUMENTS

| | | |
|---|---|---|
| CN | 102362109 | 2/2012 |
| EP | 1 235 009 | 8/2002 |
| JP | 2002-364308 | 12/2002 |
| JP | 3616016 | 2/2005 |
| JP | 2006-132635 | 5/2006 |
| JP | 2006-234106 | 9/2006 |
| JP | 2008-170005 | 7/2008 |
| JP | 2009-293784 | 12/2009 |
| KR | 10-2008-0089318 | 10/2008 |
| KR | 10-2011-0013441 | 2/2011 |
| WO | 00/03164 | 1/2000 |
| WO | 2010/146797 | 12/2010 |
| WO | 2010/146805 | 12/2010 |

OTHER PUBLICATIONS

Written Opinion of the International Searching Authority mailed Mar. 5, 2013 in International (PCT) Application No. PCT/JP2013/052376 with a partial English translation.
Office Action issued Jul. 22, 2015, in corresponding Chinese Application No. 201380010928.1 with partial English translation.
Office Action issued Sep. 1, 2015, in corresponding Korean Application No. 10-2014-7021763 with English translation.
Extended European Search Report issued Jan. 22, 2016 in corresponding European Patent Application No. 13757238.4.

* cited by examiner

SHAFT SEALING APPARATUS

FIELD OF THE INVENTION

The present invention relates to a shaft sealing apparatus that encapsulates an annular space between a rotor and a stator and divides the annular space into a low-pressure side region and a high-pressure side region.

This application claims priority to and the benefits of Japanese Patent Application No. 2012-051464 filed on Mar. 8, 2012, the disclosure of which is incorporated herein by reference.

BACKGROUND ART

To reduce an amount of leakage of a working fluid flowing from a high-pressure side to a low-pressure side, a shaft sealing apparatus is installed around a rotor in a rotating machine such as a gas turbine or a steam turbine. As an example of the shaft sealing apparatus, for example, the shaft sealing apparatus disclosed in Patent Document 1 below is known.

Such a shaft sealing apparatus is equipped with a housing installed on a stator, and a seal body made up of numerous thin seal pieces.

The seal body is configured so that the numerous thin seal pieces are stacked apart from each other at minute intervals with a thickness direction of each thin seal piece directed in a circumferential direction of a rotor. Each thin seal piece is slantingly disposed so that a radial inner end (front end) thereof is located at a position closer to a rotating-direction front side of the rotor than a radial outer end (rear end) thereof. The thin seal pieces are configured so that the rear ends thereof are connected to one another, and so that the front ends thereof are free ends.

In the shaft sealing apparatus schematically configured in this way, when the rotor stands still, the front end of each thin seal piece is in contact with the rotor. In contrast, when the rotor rotates, the front end of each thin seal piece is raised from an outer circumference of the rotor and comes out of contact with the rotor due to a dynamic pressure effect caused by the rotation of the rotor. For this reason, in the shaft sealing apparatus, the wear of each thin seal piece is suppressed, which enables a seal service life to be increased.

On the other hand, particularly, when the rotating machine is started, pipe scale (rust, etc.) may flow from an upstream side into the seal body. This causes the pipe scale to be in a clearance between the thin seal pieces and between the seal body and a surface of the rotor. Thus, there is a possibility of the sealing performance being reduced, or of the durability being reduced due to the occurrence of wear.

As a means of avoiding this phenomenon, a biasing means of biasing a housing toward a radial outer side of the rotor is provided. Thereby, an automatic clearance adjusting function of moving the seal body toward a radial outer side with a biasing force at the time of startup/stop, and of moving the seal body toward a radial inner side with seal differential pressure at the time of rated operation is known.

RELATED ART DOCUMENTS

Patent Documents

[Patent Document 1] Japanese Patent No. 3616016

DISCLOSURE OF THE INVENTION

Problems to be Solved by the Invention

However, by giving the automatic clearance adjusting function to the shaft sealing apparatus, foreign material dischargability is improved at the time of startup/stop, but foreign materials cannot be discharged during rated operation. Further, typically, under a high-pressure difference condition under which the shaft sealing apparatus having the automatic clearance adjusting function operates, at the time of rated operation, a difference between pressures occurring in front of and behind the seal body is increased, and a problem with pressure resistance of the seal body may occur.

The present invention provides a shaft sealing apparatus equipped with a seal body formed by stacking a plurality of thin seal pieces, capable of improving the performance stability of the seal body.

Means for Solving the Problems (1) According to a first aspect of the present invention, there is provided a shaft sealing apparatus, which is installed in an annular space between a rotor and a stator surrounding an outer circumference side of the rotor and divides the annular space into a low-pressure side region and a high-pressure side region in an axial direction of the rotor by a sealing apparatus body supported on the stator. The shaft sealing apparatus includes: the sealing apparatus body including a seal ring that is supported on the stator so as to enclose the rotor, is formed in a divided structure from a movable seal ring and a stationary seal ring whose circumferential ends are adjacent to each other, and is configured so that the movable seal ring is biased toward a radial outer side thereof by an elastic body, and a seal body formed by stacking a plurality of thin seal pieces, which extend from the seal ring toward a radial inner side of the rotor, in a circumferential direction of the rotor; and a communicating part causing the low-pressure side region and the high-pressure side region to communicate with each other.

With the aforementioned configuration, even at the time of rated operation, foreign materials are discharged via the communicating part. As such, a decrease in function and wear of a seal caused by the foreign materials can be prevented. Further, at the time of rated operation, a difference between pressures generated in front of and behind the seal body is reduced. As such, pressure resistance required for the seal body can be satisfied.

(2) In the shaft sealing apparatus set forth in the foregoing (1), the communicating part may include a plurality of through-holes that are formed in the seal body and pass through the seal body in the axial direction of the rotor.

With the aforementioned configuration, since the seal body is formed by stacking the thin seal pieces, the communicating part can be more easily formed. Further, a size of the communicating part is easily adjusted.

(3) In the shaft sealing apparatus set forth in the foregoing (1) or (2), the communicating part may include a bypass channel that is formed in the seal ring, and causes the high-pressure side region directly in front of the seal body to communicate with the low-pressure side region while bypassing the seal body.

(4) In the shaft sealing apparatus set forth in the foregoing (1) to (3), the seal body may include a support part mounted on the seal ring and a brush seal made up of a plurality of wires protruding from the support part toward a side of the rotor at an upstream side of the seal body, and the brush seal may perform sealing by coming into contact with the rotor by elastic deformation of the plurality of the wire.

With the aforementioned configuration, since pressure applied to the seal body can be reduced by the brush seal, durability required for the seal body can be further reduced. Further, by disposing the brush seal at the upstream side, inflow of foreign materials into the seal body of the downstream side can also be suppressed.

(5) In the shaft sealing apparatus set forth in the foregoing (1) to (4), the seal body may include a plurality of seal fins, at at least one of upstream and downstream sides of the seal body, which are mounted on an inner surface of the seal ring apart from each other at intervals in the axial direction of the rotor and which are in contact with an outer surface of the rotor.

Effects of the Invention

According to the shaft sealing apparatus of each aspect of the present invention, even at the time of rated operation, foreign materials are discharged via the communicating part. As such, a decrease in function and wear of a seal caused by the foreign materials can be prevented. Further, at the time of rated operation, a difference between pressures generated in front of and behind the seal body is reduced. As such, pressure resistance required for the seal body can be satisfied.

DESCRIPTION OF EMBODIMENTS

First Embodiment

Hereinafter, a first embodiment of the present invention will be described in detail with reference to the drawings.

Figure 1:
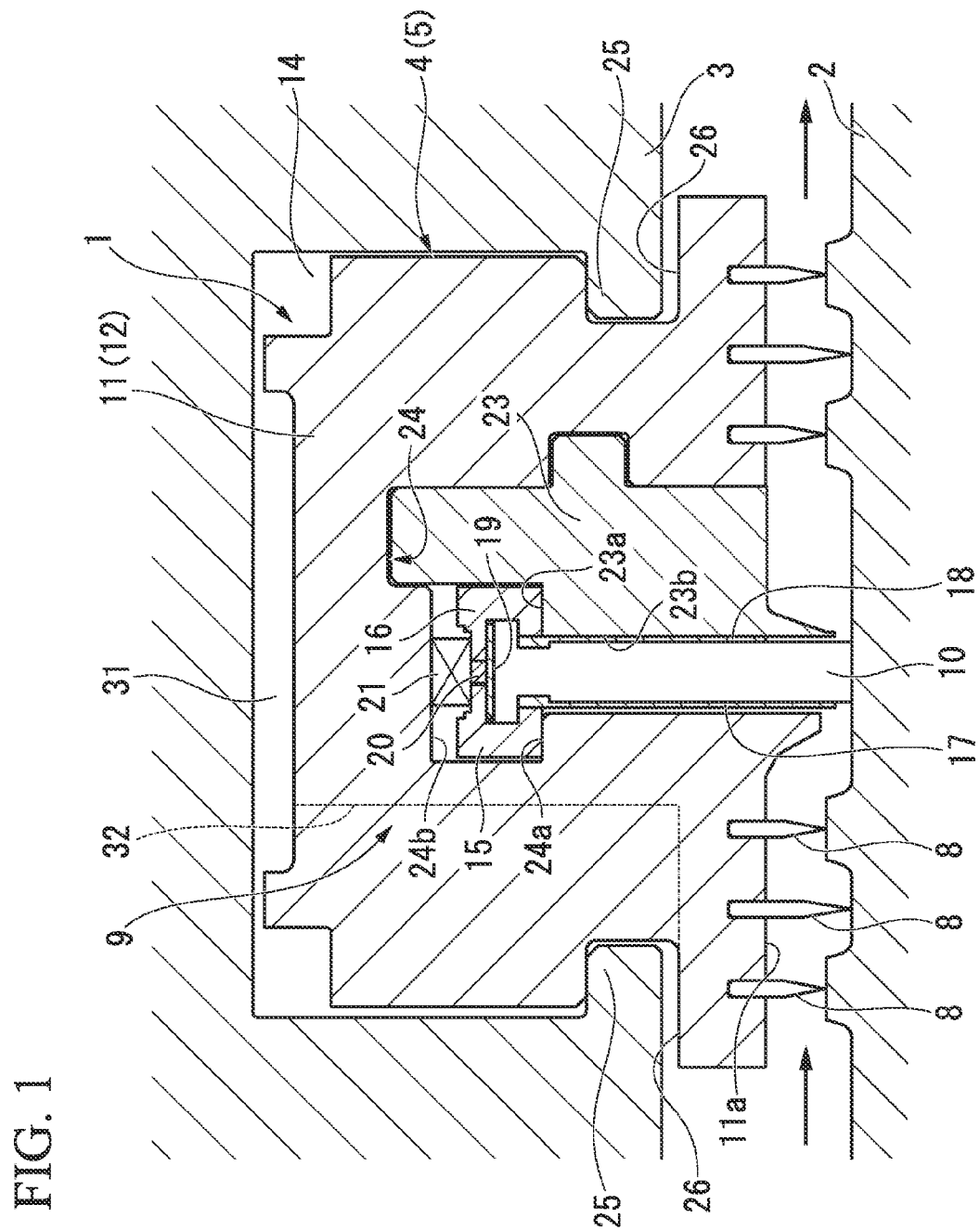
FIG. 1 is a schematic configuration view of a shaft sealing apparatus according to a first embodiment of the present invention in a cross section including an axial direction.
Figure 2:
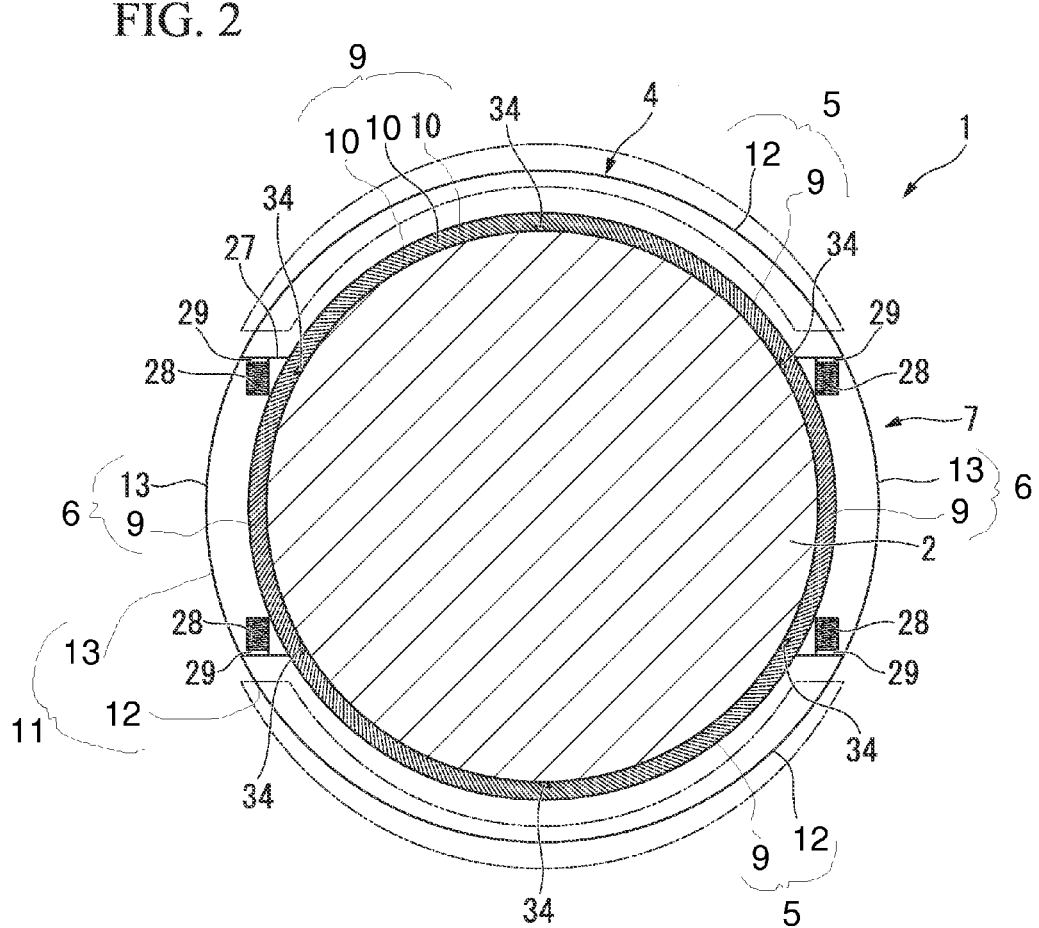
FIG. 2 is a cross-sectional view that is viewed from the axial direction and is intended to describe an automatic clearance adjusting mechanism and a plurality of communicating parts in the first embodiment of the present invention.

A shaft sealing apparatus 1 of the present embodiment is applied to, for instance, a gas turbine (rotating machine). As shown in FIGS. 1 and 2, the shaft sealing apparatus 1 of the present embodiment is installed in an annular space between a rotor 2 and a stator 3. The shaft sealing apparatus 1 is a device that divides the annular space into a low-pressure side region and a high-pressure side region. An inner circumferential surface of the stator 3 which faces an outer circumferential surface of the rotor 2 is formed with a recess 14 that is formed around a central axis of the rotor 2 in an annular shape, and the shaft sealing apparatus 1 is housed in the recess 14.

As shown in FIG. 2, the shaft sealing apparatus 1 includes a sealing apparatus body 4 supported on the stator 3, and an automatic clearance adjusting mechanism 7 automatically adjusting a clearance between the sealing apparatus body 4 and the rotor 2. The sealing apparatus body 4 is made up of two movable sealing apparatus bodies 5 and two stationary sealing apparatus bodies 6. The movable sealing apparatus bodies 5 are configured to be movable in a direction in which they are separated from the rotor 2. The stationary sealing apparatus bodies 6 are fixed to the side of the stator 3.

Both the two movable sealing apparatus bodies 5 and the two stationary sealing apparatus bodies 6 are configured so that outer diameters thereof have an arch shape when viewed from a direction running along the central axis of the rotor 2, and are configured so as to form a toric shape by juncture. That is, the shaft sealing apparatus 1 is structurally divided in a circumferential direction of the rotor 2.

Here, the movable sealing apparatus body 5 will be described first.

As shown in FIG. 1, the movable sealing apparatus body 5 includes a movable seal ring 12 housed in the recess 14, a plurality of seal fins 8 mounted on an inner surface of the movable seal ring 12 apart from each other at intervals in an axial direction of the rotor 2, and a seal body 9 formed by stacking a plurality of thin seal pieces 10, which extend from the movable seal ring 12 toward a radial inner side of the rotor 2, in the circumferential direction of the rotor 2.

Figure 3:
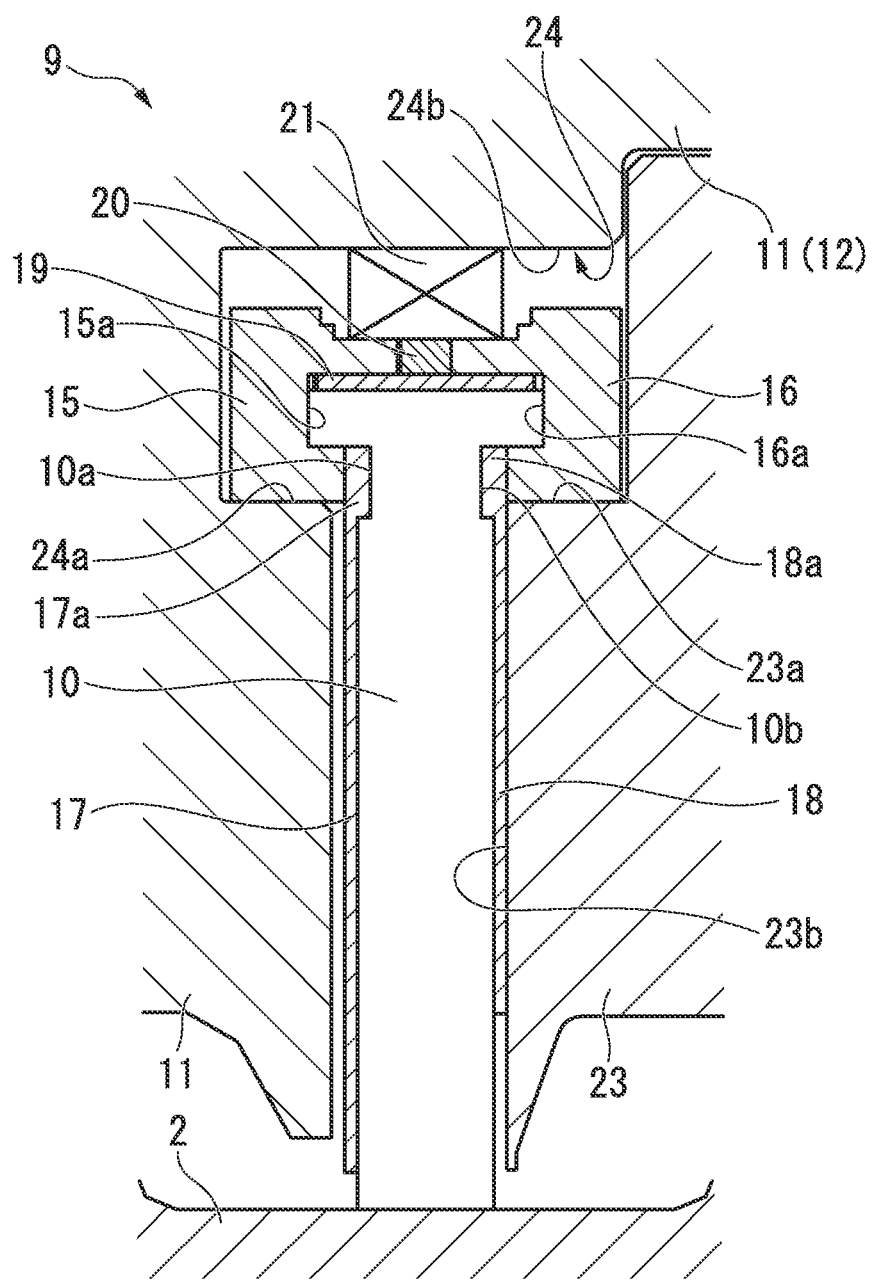
FIG. 3 is an enlarged view of the seal body of FIG. 1.

As shown in FIG. 3, the seal body 9 has the plurality of thin seal pieces 10 that are multiply arranged apart from each other at minute intervals in the circumferential direction of the rotor 2 and are formed of a metal, and C-shaped holding rings 15 and 16 that are sandwiched from opposite sides of the thin seal pieces 10 at outer-circumference-side base ends of the thin seal pieces 10.

Further, a high-pressure side lateral plate 17 is sandwiched between one lateral edge of the thin seal pieces 10 which faces the high-pressure side region and the holding ring 15. A low-pressure side lateral plate 18 is sandwiched between the other lateral edge of the thin seal pieces 10 which faces the high-pressure side region and the holding ring 16.

Further, an outer circumference side of the thin seal pieces 10 is provided with a connecting member 19 connecting the holding rings 15 and 16, a spacer 20 suppressing shaking of each thin seal piece 10 sandwiched by the holding rings 15 and 16, and a leaf spring 21 supporting each thin seal piece 10 sandwiched by the holding rings 15 and 16 in a biased state so as to form the same axis as the rotor 2.

Further, an outer circumferential surface of the movable seal ring 12 is provided with a steam pressure acting face 31. The movable seal ring 12 is provided with a plurality of notches 32 in the circumferential direction that cause the high-pressure side region and the steam pressure acting face 31 to communicate with each other.

In the seal body 9 configured in this way, the thin seal pieces 10 are formed of approximately a T-shaped thin steel sheet in which a width of an inner circumference side thereof (axial width of the rotor 2) is narrower than that of the outer-circumference side base end thereof (axial width of the rotor 2). At lateral edges of both side of the thin seal pieces 10, notch parts 10a and 10b are formed at positions at which the widths thereof are narrowed.

Thus, the thin seal pieces 10 are stacked so as to have the same width in the axial direction of the rotor 2, and are mutually fixed, for instance, by carrying out welding at the outer-circumference side base end thereof.

Further, these thin seal pieces 10 are designed so as to have predetermined rigidity determined by a thickness thereof in the circumferential direction of the rotor 2, and are furthermore mounted on the holding rings 15 and 16 in such a way that an angle formed by the thin seal pieces 10 and the outer circumferential surface of the rotor 2 with respect to the rotating direction of the rotor 2 becomes an acute angle.

Further, the high- and low-pressure side lateral plates 17 and 18 are provided with step parts 17a and 18a so that widths of outer-circumference sides thereof widen in the axial direction of the rotor 2. The step parts 17a and 18a are fitted into the notch parts 10a and 10b of the thin seal pieces 10, respectively.

Also, the holding ring 15 is provided with a concave groove 15a in a face thereof which faces one lateral edge (high-pressure side) of the outer-circumference side base end of the plurality of thin seal pieces 10. The holding rings 16 are provided with a concave groove 16a in a face thereof which faces the other lateral edge (low-pressure side) of the outer-circumference side base end of the plurality of thin seal pieces 10. Thus, regarding the plurality of thin seal pieces 10 in which the step parts 17a and 18a of the high- and low-pressure side lateral plates 17 and 18 are fitted into the notch parts 10a and 10b, the concave groove 15a of the holding ring 15 fits with one lateral edge (high-pressure side) of the outer-circumference side base end thereof, and furthermore the other lateral edge (low-pressure side) of the outer-circumference side base end thereof is fitted into the concave groove 16a of the holding ring 16.

The connecting member 19 is inserted between the holding rings 15 and 16 into which the outer-circumference side base end of the plurality of thin seal pieces 10 is fitted in this way, and the connecting member 19 is welded with the holding rings 15 and 16. Thereby, the holding rings 15 and 16 are mutually fixed. Further, the spacer 20 is inserted between the outer-circumference side base end of each thin seal piece 10 and the holding rings 15 and 16 so as to be in contact with the outer-circumference side base end of each thin seal piece 10 and the holding rings 15 and 16. Thus, the leaf spring 21 is fixed in such a way that it is brought into contact with the spacer 20 and the holding rings 15 and 16 at outer circumference sides of the spacer 20 and the holding rings 15 and 16.

The seal body 9 configured in this way is fitted from the side of the holding rings 15 and 16 into an annular concave groove 24 formed in the inner circumferential surface of the movable seal ring 12 along with a mounting piece 23 forming an annular shape.

Here, the annular concave groove 24 is formed in a shape in which a step is provided on a side thereof which faces one lateral edge (high-pressure side) of the thin seal pieces 10 so that a width of an outer circumference side thereof is wider than that of an inner circumference side thereof in the radial direction of the rotor 2. Thereby, a sliding contact face 24a becoming a face directed toward the outer circumference side in the step is formed. Thus, the sliding contact face 24a is in sliding contact with the inner circumferential surface of the holding ring 15 of the seal body 9. Further, an sliding contact face 24b becoming a face directed toward the inner circumference side in the concave groove 24 is in sliding contact with the leaf spring 21 provided on the outer circumference side of the seal body 9.

Further, a width of an inner circumference side of the concave groove 24 in the axial direction of the rotor 2 is formed so as to be sufficiently wider than that of the seal body 9.

Further, as shown in FIG. 1, the mounting piece 23 is provided with a step on a side thereof which faces the other lateral edge (low-pressure side) of the thin seal pieces 10 so that a width of an outer circumference side thereof is narrower than that of an inner circumference side thereof in the radial direction of the rotor 2. Thus, a face directed toward the outer circumference side in the step becomes a sliding contact face 23a. The sliding contact face 23a is in sliding contact with a face directed toward the inner circumference side of the holding ring 16.

Further, a side facing the other lateral edge (low-pressure side) of the thin seal pieces 10 in the mounting piece 23 becomes a pressure receiving face 23b that is in contact with the low-pressure side lateral plate 18.

The seal body 9 is held at the outer-circumference side base end side thereof by the concave groove 24 and the mounting piece 23 of the movable seal ring 12 having the configuration as described above. That is, the inner circumferential surfaces of the holding rings 15 and 16 are in sliding contact with the sliding contact face 24a of the concave groove 24 and the sliding contact face 23a of the mounting piece 23 respectively, and the leaf spring 21 fixed on the outer circumference sides of the holding rings 15 and 16 is in sliding contact with the sliding contact face 24b of the concave groove 24. Thereby, the seal body 9 is held in a state in which it is fitted into the movable seal ring 12.

Further, in this case, the seal body 9 is movable relative to the concave groove 24 in the axial direction of the rotor 2. Thus, when a working fluid flows from the high-pressure side region toward the low-pressure side region, gas pressure thereof is applied to the plurality of thin seal pieces 10 of the seal body 9. As such, the seal body 9 moves toward the low-pressure side, and the low-pressure side lateral plate 18 comes into contact with the pressure receiving face 23b of the mounting piece 23.

In this seal body 9, at the time of stop of the rotor 2, inner-circumference side tips of the thin seal pieces 10 come into contact with the rotor 2 with predetermined pre-load. Then, at the time of rotation of the rotor 2, the inner-circumference side tips of the thin seal pieces 10 are raised from the rotor 2 by a dynamic pressure effect caused by the rotation of the rotor 2, and the thin seal pieces 10 and the rotor 2 are in a non-contact state by way of a slight seal clearance. Accordingly, the wear of the thin seal pieces 10 and the rotor 2 is prevented, and the leakage of the working fluid from the high-pressure side region toward the low-pressure side region is suppressed.

The plurality of seal fins 8 protruding toward the side of the rotor 2 are buried in an inner circumferential surface 11a of the movable seal ring 12 which is located at a higher pressure side and a lower pressure side than the concave groove 24 of the movable seal ring 12. Thereby, a labyrinth seal is formed on the high-pressure side and the low-pressure side of the seal body 9.

The plurality of seal fins 8 are provided for the purpose of further reducing the amount of leakage of the working fluid, but provision thereof is not essential. The shaft sealing apparatus 1 may be made up of only the seal body 9. Further, the seal fins 8 may be integrally formed with the movable seal ring 12 by machining.

Up to now, the movable sealing apparatus body 5 has been described. However, the stationary sealing apparatus body 6 has approximately the same configuration as the movable sealing apparatus body 5 except that it is fixed to the side of the stator 3, whereas the movable sealing apparatus body 5 is movable.

Next, the automatic clearance adjusting mechanism 7 will be described. The automatic clearance adjusting mechanism 7 is a mechanism that moves the movable sealing apparatus body 5 constituting the sealing apparatus body 4 toward an outer diameter side of the rotor 2 at the time of startup/stop of the gas turbine.

An inner circumferential surface of the stator 3 is formed with a recess 14 formed around the central axis of the rotor 2 in an annular shape so as to extend along an entire circumference. Inner-circumference side ends of the recess 14 are provided with protrusions 25 protruding toward an inside of the recess 14 so as to extend along approximately an entire circumference. The movable seal ring 12 and the stationary seal ring 13 are formed with fitting grooves 26 engaged with the protrusions 25. The fitting grooves 26 are engaged with the protrusions 25, and thereby the movable seal ring 12 and the stationary seal ring 13 are held in the stator 3.

As shown in FIG. 2, the seal ring 11 is divided in a circumferential direction, and is made up of a pair of upper and lower movable seal rings 12 and a pair of left and right stationary seal rings 13. The movable seal ring 12 extends throughout an angle of 120° at a middle position of the rotor 2 when viewed from a direction running along an axis of the rotor 2. The stationary seal ring 13 is disposed between opposite ends of the movable seal rings 12 within an angle of 30° of each of opposite sides from a horizontal division plane of the rotating machine.

A joint face 27 between the movable seal ring 12 and the stationary seal ring 13 is formed by approximately a flat face in a horizontal direction. A pressing plate 29 urged by a disc spring 28 is mounted on the joint face 27 at a side of the stationary seal ring 13. The pressing plate 29 always presses the movable seal ring 12 in an upward or downward direction by means of the disc spring 28. The movable seal ring 12 is guided in a vertical direction by a guide member (not shown).

Next, the communicating part 34 formed in the seal body 9 will be described.

As shown in FIG. 2, the seal body 9 of the present embodiment is provided with a plurality of communicating parts 34 that are through-holes causing the low-pressure side region and the high-pressure side region to communicate with each other. The plurality of communicating parts 34 are formed in the circumferential direction of the seal body 9 continuously provided in the circumferential direction.

At the time of rated operation, when the movable sealing apparatus body 5 is located at a radial inner side of the rotor 2, i.e., when there is only a slight seal clearance between the seal body 9 and the rotor 2, the communicating parts 34 function as holes connecting the low-pressure side region and the high-pressure side region of the seal body 9.

Figure 4:
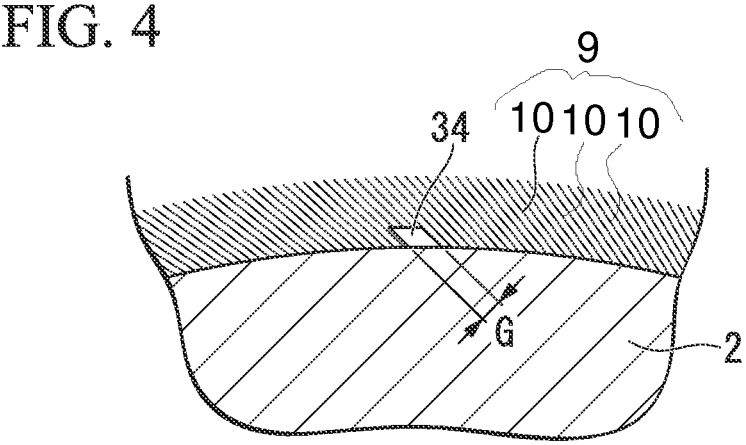
FIG. 4 is an enlarged view of the communicating part of FIG. 2.

As shown in FIG. 4, the communicating parts 34 are each formed by making lengths of the continuing numerous ones of the thin seal pieces 10 (i.e., second thin seal pieces) constituting the seal body 9 shorter than those of the other thin seal pieces 10 (i.e., first thin seal pieces). A size G of the communicating part 34 may be set to such a size as to be able to discharge, for instance, scale having a size of about 1 mm. For example, when the thickness of the thin seal piece 10 is set to 0.05 mm, the 20 continuous thin seal pieces 10 are reduced by 1 mm, and the size G can be thereby set to 1 mm square.

Figure 5:
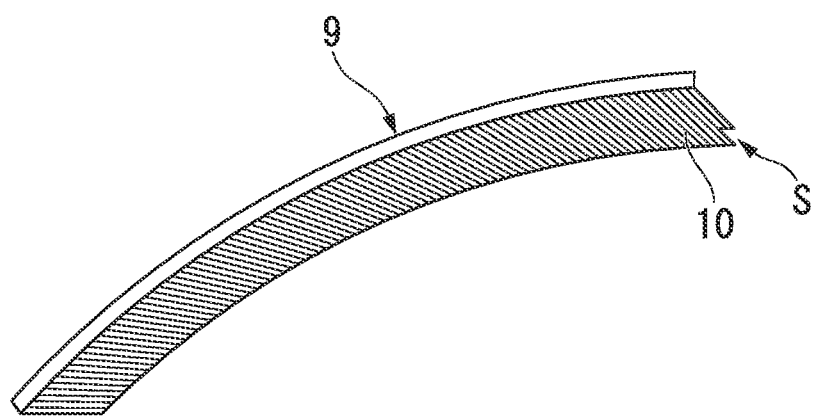
FIG. 5 is a view showing the seal body in which a thin seal piece of one end side of the seal body is shortly formed in the first embodiment of the present invention.

As shown in FIG. 5, the 20 thin seal pieces 10 provided at a region S of one circumferential end side of the seal body 9 indicated by a symbol S may be formed so as to be shorter than the other thin seal pieces 10. By this formation, the seal bodies 9 divided into a plural number (e.g. six) in the circumferential direction are connected, and thereby the communicating part 34 is configured to be formed between the neighboring seal bodies 9.

Next, an operation of the shaft sealing apparatus 1 will be described.

At the time of startup/stop of the rotating machine such as the steam turbine, the movable seal ring 12 is biased by the disc spring 28. Thereby, the movable sealing apparatus body 5 moves toward a radial outer side of the rotor 2, and a predetermined clearance is maintained among the seal body 9, the seal fins 8, and the outer circumferential surface of the rotor 2.

In this case, when pipe scale such as rust flows into the seal body 9, the pipe scale passes through a clearance. As such, there is a low possibility of a decrease in function and wear of the seal body 9 occurring.

Next, at the time of rated operation, working fluid occurs inside the rotating machine and pressure is raised, and a divisioness of the high-pressure side region and the low-pressure side region is formed. Pressure of the high-pressure side region is applied to the steam pressure acting face 31 via the notches 32, and overcomes a biasing force of the disc springs 28, and the movable sealing apparatus body 5 moves toward the side of the rotor 2. That is, the clearance among the seal body 9, the seal fins 8, and the outer circumferential surface of the rotor 2 is eliminated.

Here, when the pipe scale flows into the seal part, the pipe scale passes through the communicating parts 34 formed in the seal body 9, and is discharged to the low-pressure side region.

Next, a difference in pressure variation of the working fluid from the high-pressure side region to the low-pressure side region in the conventional shaft sealing apparatus having the automatic clearance adjusting mechanism and the shaft sealing apparatus 1 of the present embodiment will be described.

Figure 6:
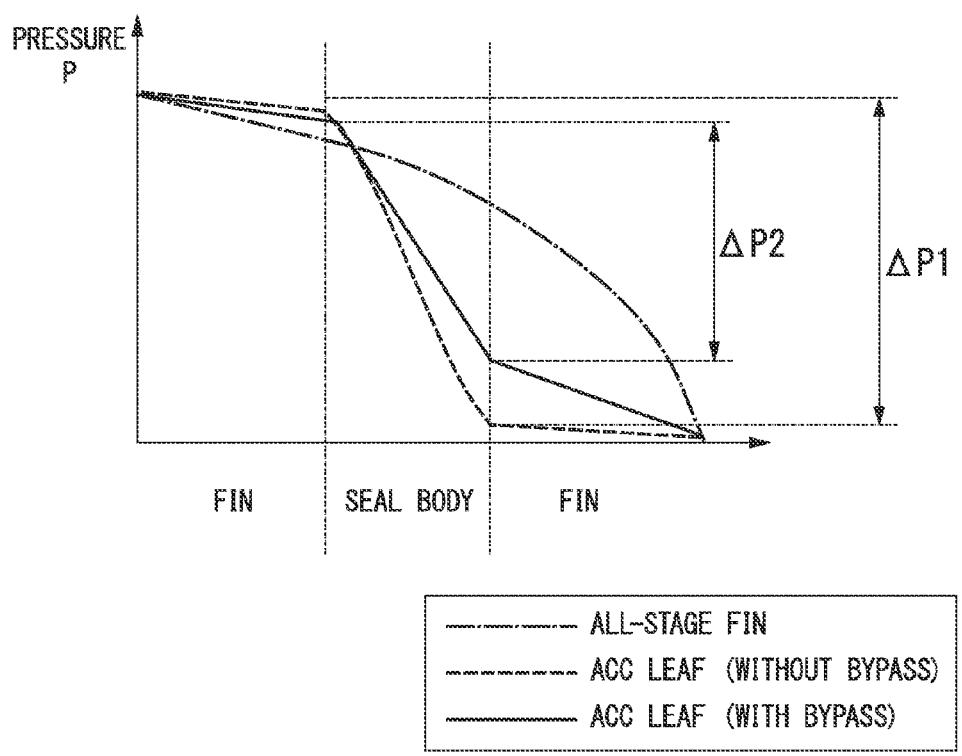
FIG. 6 is a graph intended to describe a change in pressure in front of and behind the shaft sealing apparatus according to the first embodiment of the present invention.

FIG. 6 is a graph intended to describe a difference in pressure variation of working fluid from a high-pressure side region to a low-pressure side region, wherein a longitudinal axis indicates pressure and a transverse axis indicates an axial position. Here, a line indicated by a dot and dash line shows the pressure variation of the shaft sealing apparatus which is provided with the fins on all stages and is not provided with the seal body in which the thin seal pieces are stacked. It can be seen that the pressure is smoothly lowered.

A line indicated by a broken line shows the pressure variation of the conventional shaft sealing apparatus having the automatic clearance adjusting mechanism. A differential pressure between the pressure of the working fluid after passing through the seal fins of the upstream side of the seal body and the pressure of the working fluid after passing through the seal body is $\Delta P1$. It can be seen that the pressure is abruptly lowered in the seal body and a great load is applied to the seal body.

On the other hand, a line indicated by a solid line shows the pressure variation of the shaft sealing apparatus of the present embodiment which has the automatic clearance adjusting mechanism. A differential pressure between the pressure of the working fluid after passing through the seal fins of the upstream side of the seal body and the pressure of the working fluid after passing through the seal body is ΔP2. Since the communicating parts 34 are formed, the difference between pressures in front of and behind the seal body 9 is reduced. That is, a load on the seal body is reduced.

According to the aforementioned embodiment, in the shaft sealing apparatus 1 that has the automatic clearance adjusting mechanism and that is equipped with the seal body 9 in which the plurality of thin seal pieces 10 are stacked in the circumferential direction of the rotor 2, even when the foreign materials flow from the upstream side at the time of rated operation, the foreign materials can be discharged. Thereby, a decrease in seal function and wear of the seal body 9 can be prevented.

Further, at the time of rated operation, a load applied to the seal body 9 can be reduced.

In addition, the communicating parts 34 are changed in size and number, and thereby the differential pressure can be adjusted.

Second Embodiment

Figure 7:
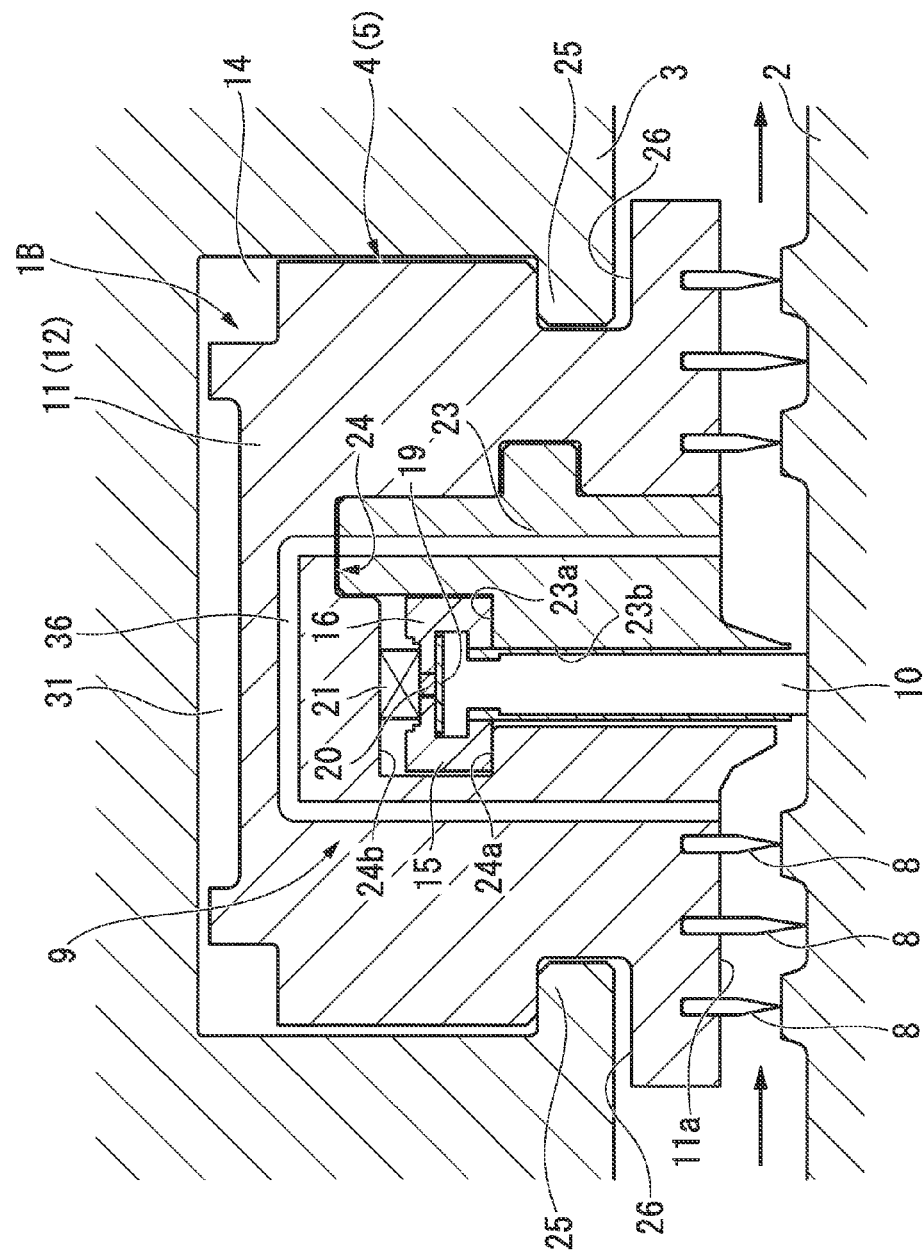
FIG. 7 is a schematic configuration view of a shaft sealing apparatus according to a second embodiment of the present invention in a cross section including an axial direction.

FIG. 7 is a schematic configuration view showing a shaft sealing apparatus 1B according to a second embodiment of the present invention. In the present embodiment, portions different from the first embodiment described above will be mainly described, and similar portions will not be described.

As shown in FIG. 7, in the shaft sealing apparatus 1B according to the present embodiment, in place of the communicating parts 34 (see FIG. 2) of the first embodiment, bypass communicating parts 36 are provided as bypass channels. The bypass communicating parts 36 are formed by passing through a seal ring 11 and a mounting piece 23 in such a way as to bypass a seal body 9, and cause a high-pressure side region and a low-pressure side region to communicate with each other. Further, the plurality of bypass communicating parts 36 are provided in a circumferential direction of the seal ring 11.

At the time of rated operation, when a movable sealing apparatus body 5 is located at a radial inner side of a rotor 2, the bypass communicating parts 36 function as holes connecting the low-pressure side region and the high-pressure side region.

According to the present embodiment, in the shaft sealing apparatus 1B that has an automatic clearance adjusting mechanism and that is equipped with the seal body 9 in which a plurality of thin seal pieces 10 are stacked in a circumferential direction of the rotor 2, even when foreign materials flow from an upstream side at the time of rated operation, the foreign materials can be discharged. Thereby, a decrease in seal function and wear of the seal body 9 can be prevented.

Further, at the time of rated operation, a load applied to the seal body 9 can be reduced.

Third Embodiment

Figure 8:
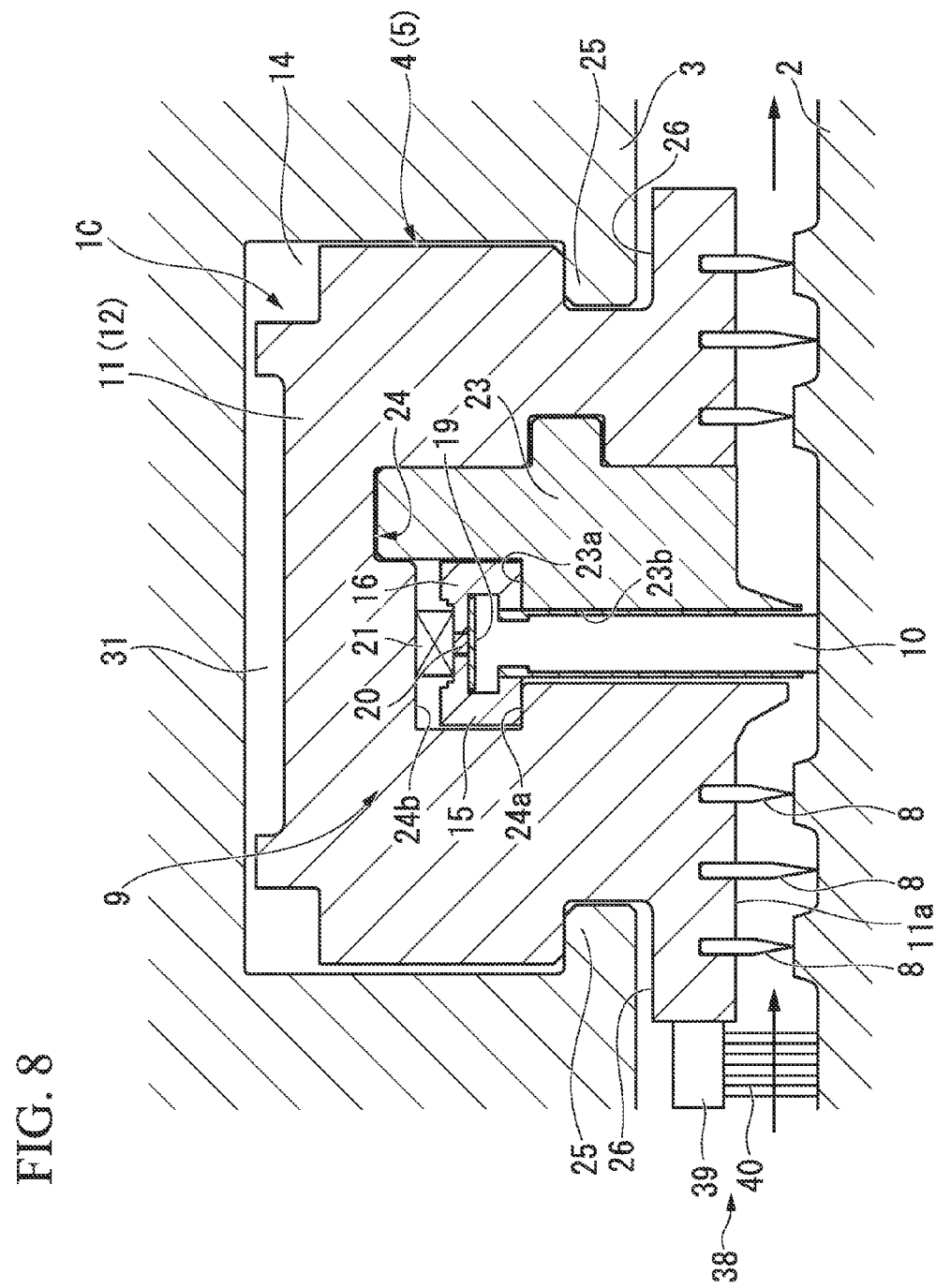
FIG. 8 is a schematic configuration view of a shaft sealing apparatus according to a third embodiment of the present invention in a cross section including an axial direction.

FIG. 8 is a schematic configuration view showing a shaft sealing apparatus 1C according to a third embodiment of the present invention. In the present embodiment, portions different from the first embodiment described above will be mainly described, and similar portions will not be described.

As shown in FIG. 8, in the shaft sealing apparatus 1C according to the present embodiment, in addition to the configuration of the first embodiment, a brush seal 38 is provided. The brush seal 38 is a toric part mounted on the most upstream side of a seal ring 11, and is divided into a plurality of segments, for instance six segments, in a circumferential direction. The brush seal 38 is made up of a support part 39 and numerous thin wires 40 welded to the support part 39. Tips of the wires 40 protrude toward a side of the rotor 2.

The plurality of wires 40 is elastically deformed, and thereby the brush seal 38 performs sealing.

Next, a difference in pressure variation of the working fluid from the high-pressure side region to the low-pressure side region in the conventional shaft sealing apparatus having the automatic clearance adjusting function and the shaft sealing apparatus 1C of the present embodiment will be described.

Figure 9:
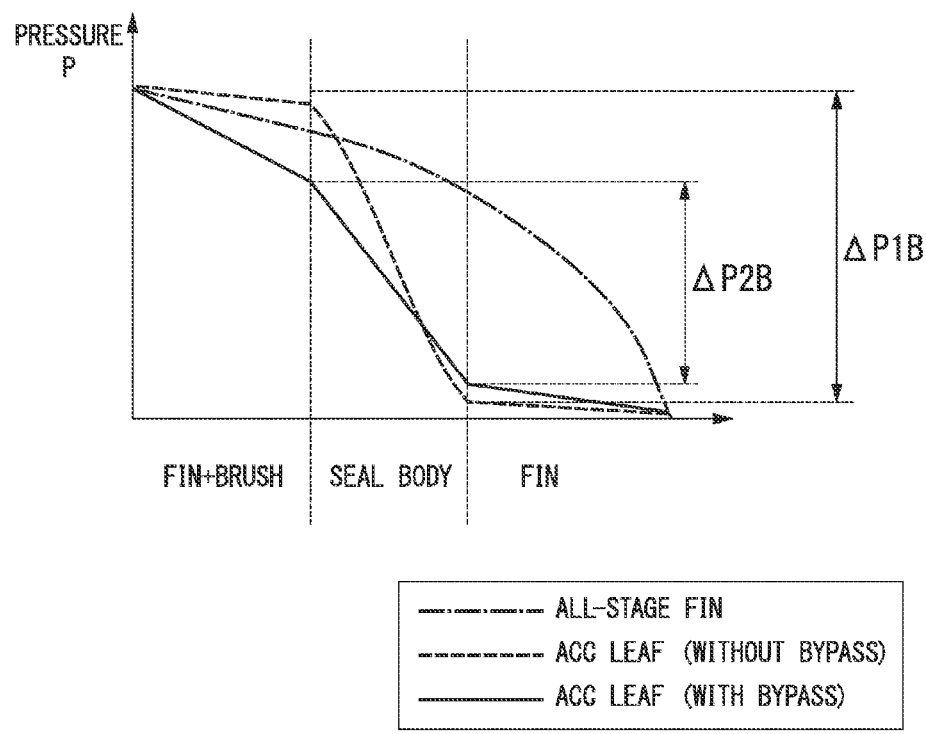
FIG. 9 is a graph intended to describe a change in pressure in front of and behind the shaft sealing apparatus according to the third embodiment of the present invention.

FIG. 9 is a graph intended to describe a difference in pressure variation of working fluid from a high-pressure side region to a low-pressure side region, wherein a longitudinal axis indicates pressure and a transverse axis indicates an axial position. Here, a dot and dash line and a broken line are similar to those of the first embodiment.

As shown in FIG. 9, since the pressure is sufficiently reduced by the brush seal 38 and the seal fins 8, a differential pressure ΔP2B between in front of and behind the seal body 9 can be further reduced compared to that of the first embodiment.

That is, a load on the seal body can be further reduced.

Further, the brush seal 38 is disposed on an upstream side, and thereby inflow of foreign materials into the seal body of a downstream side can also be suppressed.

INDUSTRIAL APPLICABILITY

The aforementioned shaft sealing apparatus can be applied to a shaft sealing apparatus that encapsulates, for instance, the annular space between the rotor and the stator, and that divides the annular space into the low-pressure side region and the high-pressure side region. Particularly, the aforementioned shaft sealing apparatus is suitable for a shaft sealing apparatus that is equipped with a seal body in which a plurality of plate seal pieces are stacked, and that can improve the performance stability of the seal body.

DESCRIPTION OF REFERENCE NUMERALS

1 . . . shaft sealing apparatus
2 . . . rotor
3 . . . stator
4 . . . sealing apparatus body
7 . . . automatic clearance adjusting mechanism
8 . . . seal fin
9 . . . seal body
10 . . . thin seal piece
11 . . . seal ring
12 . . . movable seal ring
13 . . . stationary seal ring
28 . . . disc spring (elastic body)
34 . . . communicating part
36 . . . bypass communicating part
38 . . . brush seal
39 . . . support part
40 . . . wire

The invention claimed is:

1. A shaft sealing apparatus, which is installed in an annular space between a rotor and a stator surrounding an outer circumference side of the rotor, the shaft sealing apparatus comprising:
a sealing apparatus body supported on the stator and dividing the annular space into a low-pressure side region and a high-pressure side region in an axial direction of the rotor, the sealing apparatus body including:

a mounting piece;

a low-pressure side lateral plate;

a seal ring that is supported on the stator so as to enclose the rotor, the sea ring including a movable seal ring and a stationary seal ring divided from each other and disposed along a circumferential direction of the rotor, the movable seal ring and the stationary seal ring having circumferential ends that are adjacent to each other, and the seal ring being configured so that the movable seal ring is biased toward a radial outer side thereof by an elastic body; and a seal body including a plurality of thin seal pieces that are stacked in the circumferential direction of the rotor, the seal body defining the high-pressure side region and the low-pressure side region, wherein the plurality of thin seal pieces extend from both the movable seal ring and the stationary seal ring the rotor, each of the thin seal pieces has a first surface facing the seal body, a second surface at a distal end, and third and fourth surfaces that extend parallel to the axial direction of the rotor, each of the third and fourth surfaces facing one of the third and fourth surfaces of an adjacent one of the plurality of thin seal pieces, the plurality of thin seal pieces includes a plurality of first thin seal pieces and a plurality of second thin seal pieces, the plurality of first thin seal pieces and the plurality of second thin seal pieces are arranged in a row along an outer circumferential surface of the rotor in the circumferential direction thereof, the distal end of each of the plurality of first thin seal pieces comes into contact with the rotor, each of the plurality of second thin seal pieces is located such that a gap is provided between the distal end of each of the plurality of second thin seal pieces and the rotor, each of a plurality of through-holes is formed by being enclosed by a pair of first thin seal pieces of the plurality of first thin seal pieces and a set of the plurality of second thin seal pieces disposed between the pair of first thin seal pieces, each of the plurality of through-holes extends an entire width of the plurality of thin seal pieces in the axial direction of the rotor and connects the high-pressure side region to the low-pressure side region, and the mounting piece is fixedly attached to the movable seal ring at the low-pressure side region and disposed between the low-pressure side lateral plate and the movable seal ring.

2. The shaft sealing apparatus according to claim 1, wherein the seal body includes a support part mounted on the seal ring and a brush seal including a plurality of wires protruding from the support part toward a side of the rotor at an upstream side of the seal body, the brush seal performing sealing by coming into contact with the rotor by elastic deformation of the plurality of wires.

3. The shaft sealing apparatus according to claim 1, wherein the seal body includes a plurality of seal fins at at least one of upstream and downstream sides of the seal body, the plurality of seal fins being mounted on an inner surface of the seal ring apart from each other at intervals in the axial direction of the rotor and being in contact with an outer surface of the rotor.

* * * * *